(12) United States Patent
Downton (10) Patent No.: US 8,469,104 B2
(45) Date of Patent: Jun. 25, 2013

(54) VALVES, BOTTOM HOLE ASSEMBLIES, AND METHOD OF SELECTIVELY ACTUATING A MOTOR

(75) Inventor: Geoffrey C. Downton, Gloucestershire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 425 days.

(21) Appl. No.: 12/556,077

(22) Filed: Sep. 9, 2009

(65) Prior Publication Data

US 2011/0056695 A1 Mar. 10, 2011

(51) Int. Cl.
*E21B 34/06* (2006.01)
*E21B 4/02* (2006.01)

(52) U.S. Cl.
USPC ........... 166/373; 166/330; 166/66.6; 175/107

(58) Field of Classification Search
USPC .................. 166/66.6, 104, 330, 373; 175/26, 175/107; 418/17, 48
See application file for complete search history.

(56) References Cited

U.S. PATENT DOCUMENTS

| | | | |
|---|---|---|---|
| 2,464,011 A | 3/1949 | Wade | |
| 2,735,653 A * | 2/1956 | Bielstein | ............. 91/40 |
| 4,304,261 A | 12/1981 | Forester | |
| 4,637,479 A * | 1/1987 | Leising | ............. 175/26 |
| 4,646,856 A | 3/1987 | Dismukes | |
| 4,909,337 A | 3/1990 | Kochnev et al. | |
| 5,113,953 A | 5/1992 | Noble | |
| 5,135,059 A | 8/1992 | Turner et al. | |
| 5,221,197 A | 6/1993 | Kochnev et al. | |
| 5,265,682 A | 11/1993 | Russell et al. | |
| 5,314,030 A * | 5/1994 | Peterson et al. | ............. 175/26 |
| 5,443,129 A | 8/1995 | Bailey et al. | |
| 5,520,255 A | 5/1996 | Barr et al. | |
| 5,553,678 A | 9/1996 | Barr et al. | |
| 5,553,679 A | 9/1996 | Thorp | |
| 5,563,679 A | 10/1996 | Dobashi | |
| 5,582,259 A | 12/1996 | Barr | |
| 5,603,385 A | 2/1997 | Colebrook | |
| 5,673,763 A | 10/1997 | Thorp | |
| 5,685,379 A | 11/1997 | Barr et al. | |
| 5,695,015 A | 12/1997 | Barr et al. | |
| 5,706,905 A | 1/1998 | Barr | |
| 5,778,992 A | 7/1998 | Fuller | |
| 5,803,185 A | 9/1998 | Barr et al. | |
| 5,894,011 A | 4/1999 | Prosl et al. | |
| 5,911,284 A | 6/1999 | Von Gynz-Rekowski | |
| 5,971,085 A | 10/1999 | Colebrook | |

(Continued)

OTHER PUBLICATIONS

Gelfgat, Yakov A., et al., "Advanced Drilling Solutions: Lessons from the FSU," 154-72 (2003).

(Continued)

*Primary Examiner* — William P Neuder
*Assistant Examiner* — Robert E Fuller
(74) *Attorney, Agent, or Firm* — Kimberly Ballew (57) ABSTRACT

A system and methodology provide valves, bottom hole assemblies, and methods of selectively actuating a motor. One aspect provides a valve including: a barrel having an interior having a circular cross-section, an inlet port, an outlet port, and a by-pass port; a first disc rotatably received within the barrel; and a second disc rotatably received within the barrel and pressed against the first disc to selectively form a seal. The first disc and the second each have an orifice.

18 Claims, 5 Drawing Sheets

U.S. PATENT DOCUMENTS

| | | |
|---|---|---|
| 6,089,332 A | 7/2000 | Barr et al. |
| 6,092,610 A | 7/2000 | Kosmala et al. |
| 6,158,529 A | 12/2000 | Dorel |
| 6,173,794 B1 | 1/2001 | Von Gynz-Rekowski et al. |
| 6,244,361 B1 | 6/2001 | Comeau et al. |
| 6,364,034 B1 | 4/2002 | Schoeffler |
| 6,394,193 B1 | 5/2002 | Askew |
| 6,527,512 B2 | 3/2003 | Bertin et al. |
| 6,543,132 B1 | 4/2003 | Krueger et al. |
| 6,543,554 B2 | 4/2003 | Smith |
| 6,626,254 B1 * | 9/2003 | Krueger et al. ............... 175/61 |
| 6,827,160 B2 | 12/2004 | Blair et al. |
| 7,093,401 B2 | 8/2006 | Collins |
| 7,192,260 B2 | 3/2007 | Lievestro et al. |
| 7,396,220 B2 | 7/2008 | Delpassand et al. |
| 7,442,019 B2 | 10/2008 | Kaiser et al. |
| 7,730,975 B2 * | 6/2010 | Hall et al. ............... 175/389 |
| 2001/0052428 A1 | 12/2001 | Larronde et al. |
| 2002/0011359 A1 | 1/2002 | Webb et al. |
| 2002/0122722 A1 | 9/2002 | Bertain et al. |
| 2005/0109542 A1 * | 5/2005 | Downton ............... 175/73 |
| 2005/0211471 A1 * | 9/2005 | Zupanick ............... 175/57 |
| 2006/0131030 A1 | 6/2006 | Sheffield |
| 2006/0243493 A1 | 11/2006 | El-Rayes et al. |
| 2007/0154341 A1 | 7/2007 | Saenger |
| 2007/0202350 A1 | 8/2007 | Humphreys et al. |
| 2007/0221409 A1 * | 9/2007 | Hall et al. ............... 175/61 |
| 2008/0190669 A1 | 8/2008 | Cioceanu |
| 2009/0095528 A1 | 4/2009 | Hay et al. |

OTHER PUBLICATIONS

Lyons, William C. et al., "Air & Gas Drilling Manual: Applications for Oil & Gas Recovery Wells & Geothermal Fluids Recovery Wells" 11.2 (3d ed. 2009).

Lyons, William C. and Plisga, Gary J., editors, "Standard Handbook of Petroleum & Natural Gas Engineering," 4-276-4-299 (2006).

Samuel, G. Robello, "Downhole Drilling Tools: Theory & Practice for Engineers & Students," pp. 288-333 (2007).

* cited by examiner

VALVES, BOTTOM HOLE ASSEMBLIES, AND METHOD OF SELECTIVELY ACTUATING A MOTOR

BACKGROUND OF THE INVENTION

Mud motors are powerful generators used in drilling operations to turn a drill bit, generate electricity, and the like. The speed and torque produced by a mud motor is affected by the design of the mud motor and the flow of mud (drilling fluid) into the mud motor. Control over these parameters is attempted from the surface of a wellbore by adjusting the flow rate and pressure of mud, adjusting the weight on the drill bit (WOB). The fidelity of control by these techniques is poor, however. Motors can stall and suffer speed variations as a consequence of loading and drill string motion. Accordingly, there is a need for devices and methods for more responsively and precisely controlling the operation of a mud motor.

SUMMARY OF THE INVENTION

Aspects of the invention provide valves, bottom hole assemblies, and methods of selectively actuating a motor.

One aspect of the invention provides a valve including: a barrel having an interior having a circular cross-section, an inlet port, an outlet port, and a by-pass port; a first disc rotatably received within the barrel; and a second disc rotatably received within the barrel and pressed against the first disc to selectively form a seal. The first disc and the second each have an orifice.

This aspect can have a variety of embodiments. In one embodiment, the barrel defines a proximal end and a distal end, the inlet port and the by-pass port are located proximal to the discs, and the outlet port is located distal to the discs. The discs can have a substantially circular profile. The orifice can be bounded by the circular profile of the discs. In some embodiments, the orifice is substantially sector-shaped.

The first disc can be coupled to a first stem and the second disc can be coupled to second stem. The discs can be pressed together by the stems. The discs can be pressed together by one or more springs. The discs can be pressed together by one or more bearings.

The discs can include a wear-resistant material. The first disc can be coupled to a control unit. The second disc can be coupled to a rotor in a motor. The outlet port can be in fluid communication with the motor. The inlet port can be in fluid communication with an internal cavity of a drill string. The by-pass port can be in fluid communication with the internal cavity of the drill string.

Another aspect of the invention provides a bottom hole assembly comprising: a motor including a rotor and a stator; a valve including a barrel having an interior having a circular cross-section, an inlet port, an outlet port, and a by-pass port; a first disc rotatably received within the barrel, the first disc having an orifice; and a second disc rotatably received within the barrel and pressed against the first disc to selectively form a seal, the second disc having an orifice; and a control unit. The first disc is coupled to the control unit. The second disc is coupled to the rotor. The outlet port is in fluid communication with the stator.

This aspect can have a variety of embodiments. In one embodiment, the inlet port is in fluid communication with a fluid source. The fluid source can be an internal cavity of the bottom hole assembly. The by-pass port can be in fluid communication with the internal cavity.

Another aspect of the invention provides a method of selectively actuating a motor including a rotor and a stator. The method includes: providing a valve including: a barrel having an interior having a circular cross-section, an inlet port, an outlet port, and a by-pass port; a first disc rotatably received within the barrel, the first disc having an orifice; and a second disc rotatably received within the barrel and pressed against the first disc to selectively form a seal, the second disc having an orifice; providing a control unit coupled with the first disc; and selectively actuating the control unit to rotate the first disc to a desired position to selectively permit fluid flow through the orifices and to the motor. The second disc is coupled to the rotor. The outlet port is in fluid communication with the motor.

DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

DETAILED DESCRIPTION OF THE INVENTION

Aspects of the invention provide valves, bottom hole assemblies, and methods of selectively actuating a motor. Various embodiments of the invention can be used in wellsite systems.

Wellsite System

Figure 1:
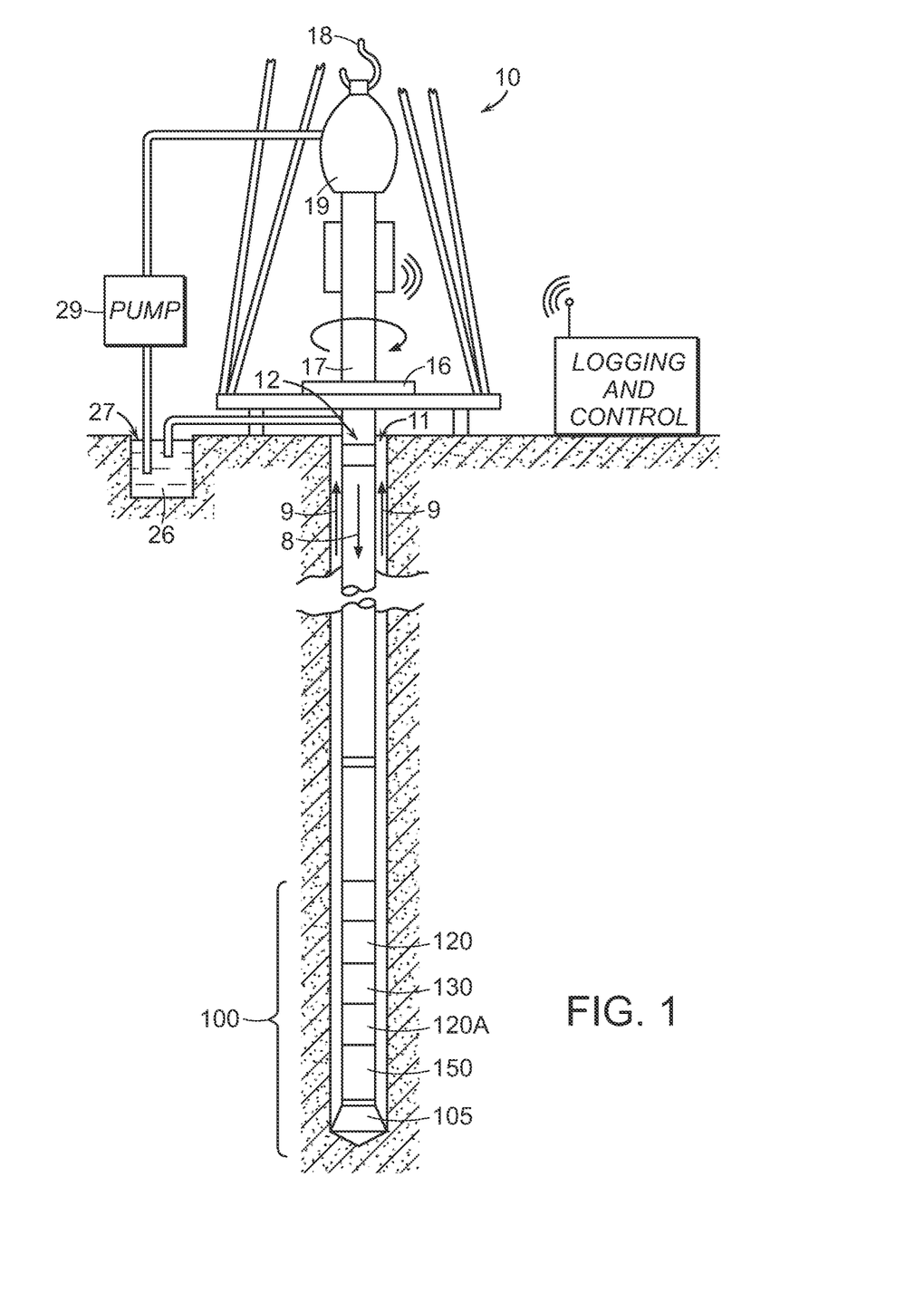
FIG. 1 illustrates a wellsite system in which the present invention can be employed.

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly (BHA) 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a pressure measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator (also known as a "mud motor") powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or "directional drilling." In this embodiment, a roto-steerable subsystem 150 (FIG. 1) is provided. Directional drilling is the intentional deviation of the wellbore from the path it would naturally take. In other words, directional drilling is the steering of the drill string so that it travels in a desired direction.

Directional drilling is, for example, advantageous in offshore drilling because it enables many wells to be drilled from a single platform. Directional drilling also enables horizontal drilling through a reservoir. Horizontal drilling enables a longer length of the wellbore to traverse the reservoir, which increases the production rate from the well.

A directional drilling system may also be used in vertical drilling operation as well. Often the drill bit will veer off of a planned drilling trajectory because of the unpredictable nature of the formations being penetrated or the varying forces that the drill bit experiences. When such a deviation occurs, a directional drilling system may be used to put the drill bit back on course.

A known method of directional drilling includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling.

Rotary steerable drilling systems for drilling deviated boreholes into the earth may be generally classified as either "point-the-bit" systems or "push-the-bit" systems.

In the point-the-bit system, the axis of rotation of the drill bit is deviated from the local axis of the bottom hole assembly in the general direction of the new hole. The hole is propagated in accordance with the customary three-point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems and how they operate are described in U.S. Pat. Nos. 6,394,193; 6,364,034; 6,244,361; 6,158,529; 6,092,610; and 5,113,953; and U.S. Patent Application Publication Nos. 2002/0011359 and 2001/0052428.

In the push-the-bit rotary steerable system there is usually no specially identified mechanism to deviate the bit axis from the local bottom hole assembly axis; instead, the requisite non-collinear condition is achieved by causing either or both of the upper or lower stabilizers to apply an eccentric force or displacement in a direction that is preferentially orientated with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form, the drill bit is required to cut side ways in order to generate a curved hole. Examples of push-the-bit type rotary steerable systems and how they operate are described in U.S. Pat. Nos. 6,089,332; 5,971,085; 5,803,185; 5,778,992; 5,706,905; 5,695,015; 5,685,379; 5,673,763; 5,603,385; 5,582,259; 5,553,679; 5,553,678; 5,520,255; and 5,265,682.

Face-Sealing Valves

Figure 2A:
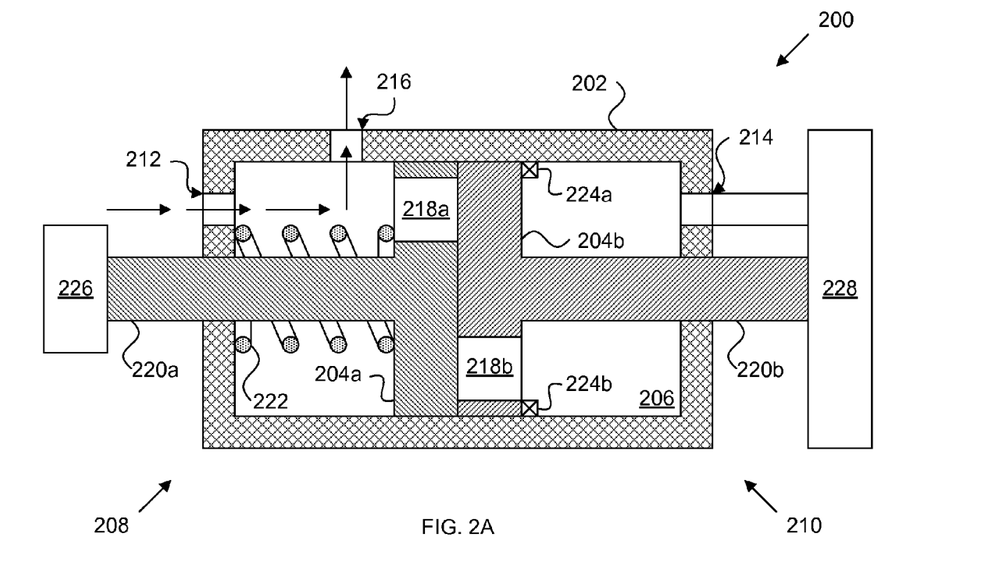
FIGS. 2A and 2B illustrate a cross section of a face-sealing valve according to one embodiment of the invention.
Figure 2B:
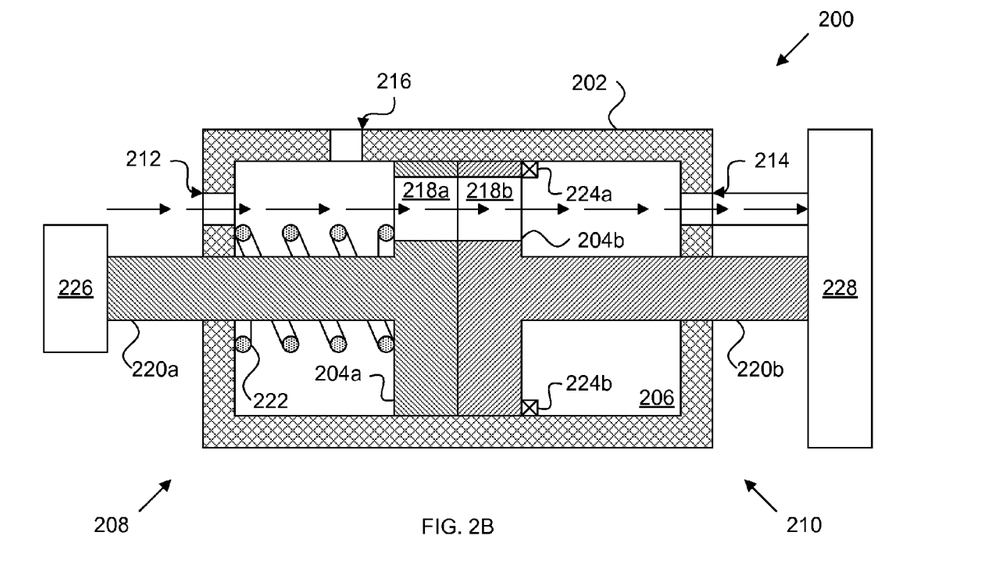

Referring to FIGS. 2A and 2B, a cross section of a face-sealing valve 200 is depicted. Face-sealing valve 200 includes a barrel 202, a first disc 204a, and a second disc 204b.

Barrel 202 defines an interior region 206 that has a substantially circular cross section as well as a proximal end 208 and a distal end 210. Barrel 202 also includes an inlet port 212, an outlet port 214, and a by-pass port 216. Inlet port 212 and by-pass port 216 are located proximal to discs 204. Outlet port 214 is located distal to discs 204.

Discs 204 have substantially circular profile that interfaces with the substantially circular wall of barrel 202. Discs 204 include one or more orifices 218 to permit fluid to flow through the valve 200 from inlet port 212 to outlet port 214 when the orifices 218 are aligned as depicted in FIG. 2B.

Referring to FIG. 2A, when discs 204 are rotated to a position wherein orifices 218 are not aligned, fluid cannot flow through orifices 218 to outlet port 214 and instead flows through by-pass port 216.

Referring now to FIG. 2B, when discs 204 are rotated to a position wherein orifices 218 are aligned, fluid can flow through orifices 218 and exits the barrel 202 via outlet port 214.

Figure 3A:
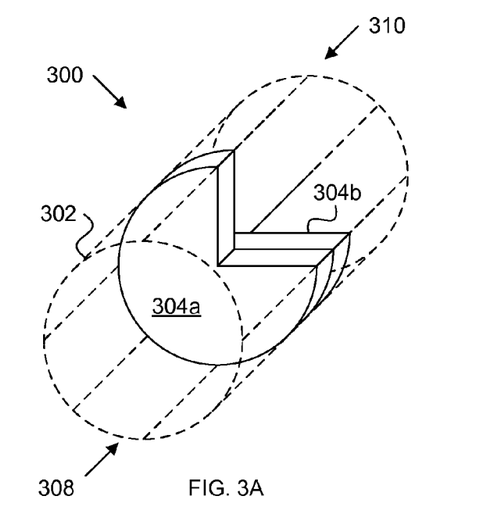
FIGS. 3A-3D illustrates the interaction of discs within a barrel according to one embodiment of the invention.
Figure 3B:
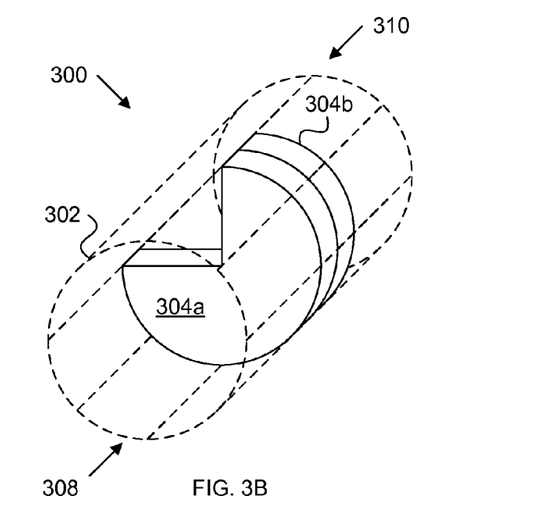

Orifices 218 can be bounded by the circular profile of discs 204 as depicted in FIGS. 2A and 2B. Alternatively, orifices 218 can be sector-shaped as depicted in FIGS. 3A and 3B.

Discs 204 can be rotated by a variety of devices including stems 220. Alternatively, discs 204 can be rotated by magnetic coupling with a power source located external to the barrel 202.

Discs 204 are pressed together to form a substantially fluid tight seal when orifices 218 are not in communication. In some embodiments, discs 204 are pressed together by pressure applied to stems 220. In other embodiments, discs 204 are pressed together by one or more springs 222 within barrel 202 and/or one or more bearings or other geometric features 224 within barrel 202.

Barrel 202 and discs 204 are preferably constructed of and/or coated with wear-resistant materials that can accommodate friction during rotation of discs 204 (e.g., between discs 204 and between other discs 204 and barrel 202), high temperatures, and/or abrasive fluids (e.g., mud). Suitable wear-resistant materials include, but are not limited to, steel, "high speed steel," carbon steel, brass, copper, iron, polycrystalline diamond compact (PDC), hardface, ceramics, carbides, ceramic carbides, cermets, and the like. Suitable coatings are described, for example, in U.S. Patent Publication No. 2007/0202350.

The first disc 204a can be coupled to a control unit 226 configured to control the actuation of valve 200. In some embodiments, the control unit 226 holds the first disc 204a at a geostationary angle as the drill string rotates.

The control unit 226 can be mounted on a bearing that allows the control unit 226 to rotate freely about the axis of the bottom hole assembly. The control unit 226, according to some embodiments, contains sensory equipment such as a three-axis accelerometer and/or magnetometer sensors to detect the inclination and azimuth of the bottom hole assembly. The control unit 226 can further communicate with sensors disposed within elements of the bottom hole assembly such that said sensors can provide formation characteristics or drilling dynamics data to control unit. Formation characteristics can include information about adjacent geologic formation gather from ultrasound or nuclear imaging devices such as those discussed in U.S. Patent Publication No. 2007/0154341, the contents of which is hereby incorporated by reference herein. Drilling dynamics data may include measurements of the vibration, acceleration, velocity, and temperature of the bottom hole assembly.

In some embodiments, control unit 226 is programmed above ground to following an desired inclination and direction. The progress of the bottom hole assembly can be measured using MWD systems and transmitted above-ground via a sequences of pulses in the drilling fluid, via an acoustic or wireless transmission method, or via a wired connection. If the desired path is changed, new instructions can be transmitted as required. Mud communication systems are described in U.S. Patent Publication No. 2006/0131030, herein incorporated by reference. Suitable systems are available under the POWERPULSE™ trademark from Schlumberger Technology Corporation of Sugar Land, Tex.

The second disc 204b can be coupled to the rotor of a downhole motor 228. The outlet port 214 can be in fluid communication with the motor such that fluid flow from outlet port 214 causes the rotor of the downhole motor 228 to rotate and turn the second disc 204b. The downhole motor 228 can turn a bit, a steering device, and the like in any desired direction. For example, the downhole motor 228 can turn a drill bit at the bottom of the drill string in the opposite direction of the drill string rotation. The inlet port 212 and by-pass port 216 can be in fluid communication with an internal cavity of the drill string to receive and exhaust fluid.

Downhole motors are described in a variety of publications such as U.S. Pat. Nos. 7,442,019; 7,396,220; 7,192,260; 7,093,401; 6,827,160; 6,543,554; 6,543,132; 6,527,512; 6,173,794; 5,911,284; 5,221,197; 5,135,059; 4,909,337; 4,646,856; and 2,464,011; U.S. Patent Application Publication Nos. 2009/0095528; 2008/0190669; and 2002/0122722; and William C. Lyons et al., *Air & Gas Drilling Manual: Applications for Oil & Gas Recovery Wells & Geothermal Fluids Recovery Wells* §11.2 (3d ed. 2009); G. Robello Samuel, *Downhole Drilling Tools: Theory & Practice for Engineers & Students* 288-333 (2007); *Standard Handbook of Petroleum & Natural Gas Engineering* 4-276-4-299 (William C. Lyons & Gary J. Plisga eds. 2006); and 1 Yakov A. Gelfgat et al., *Advanced Drilling Solutions: Lessons from the FSU* 154-72 (2003).

Referring again to FIGS. 3A-3D, the interaction of discs 304 within barrel 302 (illustrated in dashed lines) is depicted. First disc 304a has a 90° sector-shaped orifice, while second disc 304b has a 180° sector-shaped orifice.

In FIG. 3A, the first disc 304a is positioned such that its orifice is positioned in the upper right corner and the second disc 304b is positioned such that its orifice is positioned in the upper half of the barrel 302 when viewed from distal end 308.

In FIG. 3B, the second disc 304b has rotated 90° due to rotation of the downhole motor (not depicted). First disc 304a is also rotated 90° by control unit (not depicted) to maintain alignment between the orifices to permit flow of fluid to the downhole motor.

Figure 3C:
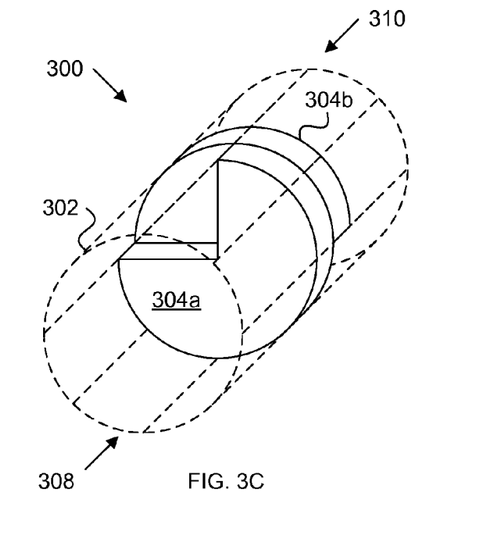

In FIG. 3C, the second disc 304b has rotated another 90° due to rotation of the downhole motor (not depicted). First disc 304a is held stationary by the control unit (not depicted). At this point, the orifices are not in alignment and fluid flows through the by-pass port instead of to the downhole motor.

Figure 3D:
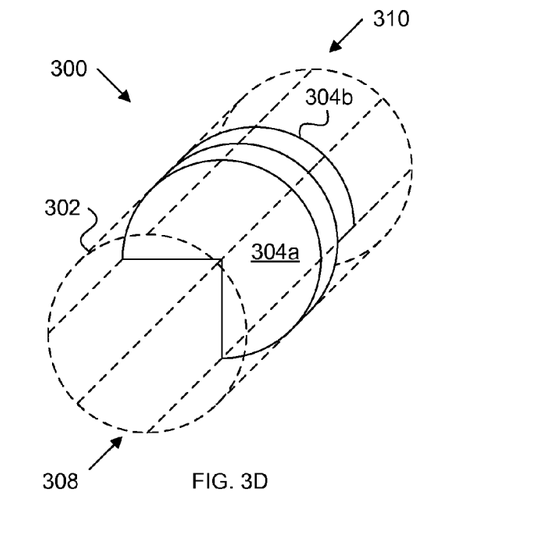

In FIG. 3D, the first disc 304a is rotated 90° by control unit (not depicted) to restore alignment with the second disc 304b, which remained stationary due to the cessation of flow through valve 300. At this point, orifices are again aligned and fluid can flow through valve 300 to the downhole motor.

Bottom Hole Assemblies

Figure 4:
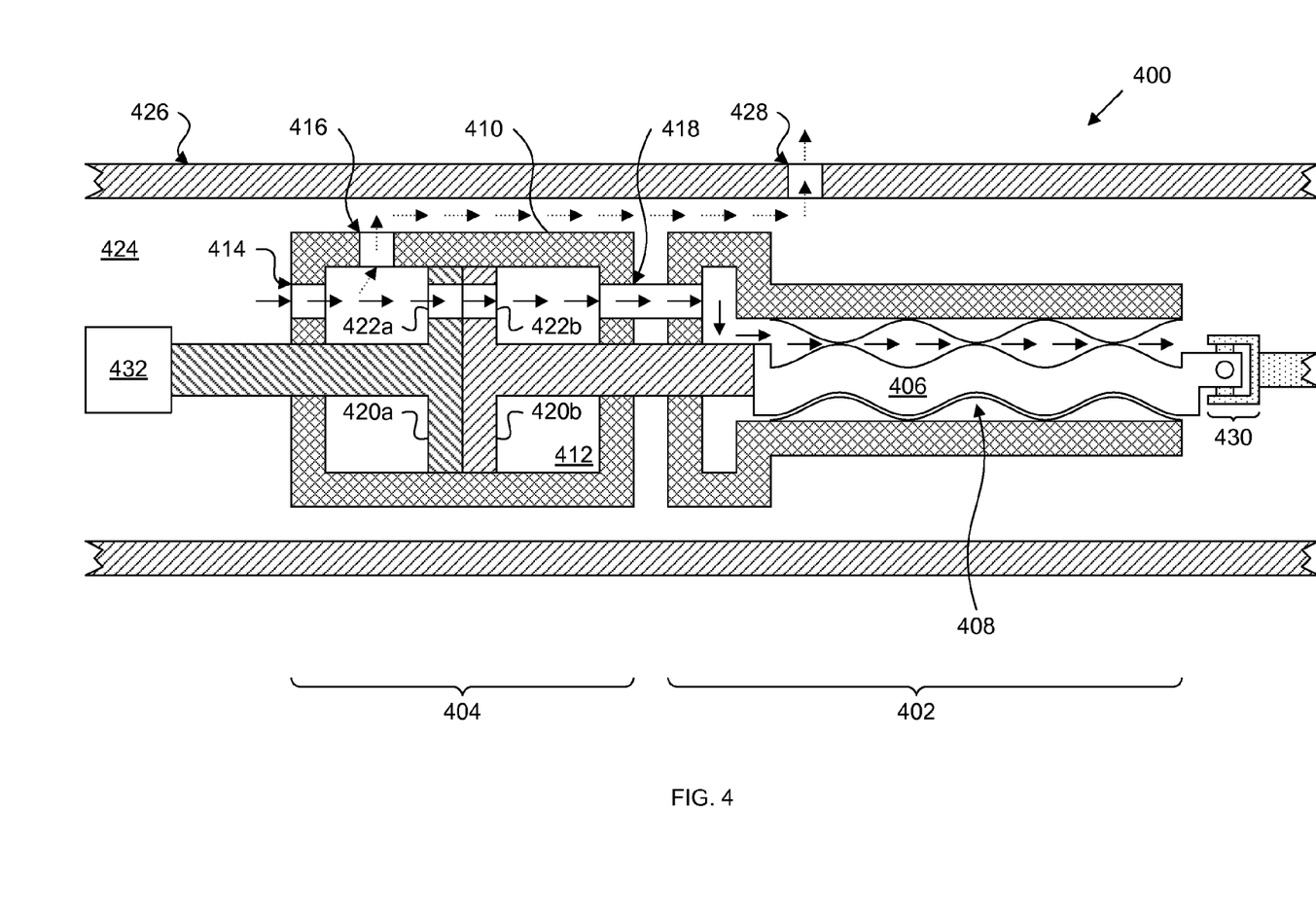
FIG. 4 depicts a cross section of a bottom hole assembly including a downhole motor and a valve according to one embodiment of the invention.

FIG. 4 depicts a cross section of a bottom hole assembly 400 including a downhole motor 402 and a valve 404. The downhole motor 402 includes a rotor 406 and a stator 408. Valve 404 includes a barrel 410 having an interior region 412 having a substantially circular cross section, an inlet port 414, an outlet port 416, and a by-pass port 418. The valve 404 also includes a first disc 420a and second disc 420b received within the interior region 412 of barrel 410. Each disc 420 has an orifice 422 that can be aligned to allow fluid (depicted in solid arrows) to flow from the internal cavity 424 of drill string 426 through inlet port 414, through orifices 422, and out through outlet port 418 into downhole motor 402 to spin rotor 406. Alternatively, when discs 420 are rotated such that orifices 422 are not aligned, fluid (depicted in dotted arrows) flows from the internal cavity 424 of drill string 426 through inlet port 414, out through the by-pass port 416 back into the internal cavity 424 of the drill string 426 before being vented at the bottom of the drill string and/or through one or more orifices 428 positioned on the drill string 426. First disc 420a can be controlled by control unit 432 and second disc 42b can be coupled to rotor 406 as discussed herein. Downhole motor 402 can be coupled to a drill bit, steering device, and the like by a variety of couplings including universal joint 430 and the like.

Method of Selectively Actuating a Motor

Figure 5:
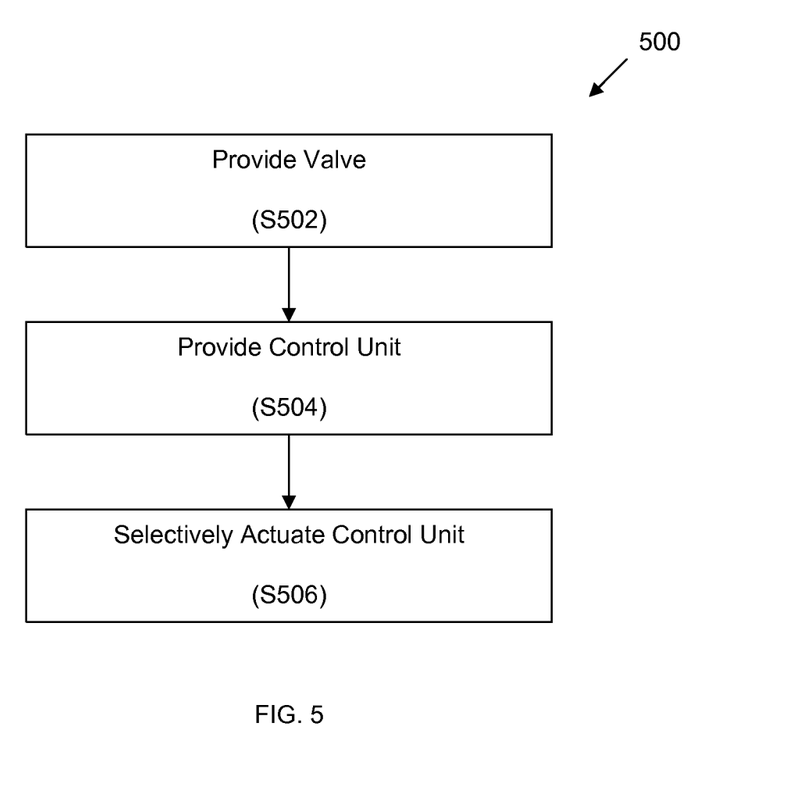
FIG. 5 depicts a method of selectively actuating a motor according to one embodiment of the invention.

Referring now to FIG. 5, a method 500 of selectively actuating a motor is provided. The motor includes a rotor and a stator.

In step S502, a valve is provided. The valve can include a barrel having an interior region having a substantially circular cross section, an inlet port, an outlet port, and a by-pass port. The valve can also include a first disc and a second disc received within the interior region of barrel. Each disc has an orifice that can be aligned to allow fluid to flow inlet port, through the orifices, and out through the outlet port. The second disc can be coupled to the rotor and the outlet port can be in fluid communication with the motor. The valve can be an embodiment of the valves described herein.

In step S504, a control unit is provided. The control unit can be coupled to the first disc.

In step S506, the control unit is selectively actuated to rotate the first disc to a desired position relative to the second disc to permit fluid flow through the orifices and to the motor.

INCORPORATION BY REFERENCE

All patents, published patent applications, and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

The invention claimed is:

1. A valve comprising:
   a barrel having:
      an interior having a circular cross-section;
      an inlet port;
      an outlet port; and
      a by-pass port;
   a first disc rotatably received within the barrel, the first disc having an orifice;
   a second disc rotatably received within the barrel and pressed against the first disc to selectively form a seal, the second disc having an orifice;
   a control unit coupled to the first disc to control rotation of the first disc relative to the second disc based on sensor data received by the control unit; and
   a downhole motor powered by fluid, the outlet port being in fluid communication with a rotor of the downhole motor, the control unit controlling flow of fluid to the rotor of the downhole motor from a downhole location to provide control over the downhole motor based on the sensor data.

2. The valve of claim 1, wherein:
   the barrel defines a proximal end and a distal end;
   the inlet port and the by-pass port are located proximal to the discs; and
   the outlet port is located distal to the discs.

3. The valve of claim 1, wherein the discs have a substantially circular profile.

4. The valve of claim 3, wherein the orifice is bounded by the circular profile of the discs.

5. The valve of claim 3, wherein the orifice is substantially sector-shaped.

6. The valve of claim 1, wherein the first disc is coupled to a first stem and wherein the second disc is coupled to second stem.

7. The valve of claim 6, wherein the discs are pressed together by the stems.

8. The valve of claim 1, wherein the discs are pressed together by one or more springs.

9. The valve of claim 1, wherein the discs are pressed together by one or more bearings.

10. The valve of claim 1, wherein the discs include a wear-resistant material.

11. The valve of claim 1, wherein the second disc is coupled to the rotor in the downhole motor.

12. The valve of claim 1, wherein the inlet port is in fluid communication with an internal cavity of a drill string.

13. The valve of claim 12, wherein the by-pass port is in fluid communication with the internal cavity of the drill string.

14. A bottom hole assembly comprising:
   a motor including:
      a rotor; and
      a stator;
   a valve including:
      a barrel having:
         an interior having a circular cross-section;
         an inlet port;
         an outlet port; and
         a by-pass port;
      a first disc rotatably received within the barrel, the first disc having an orifice; and
      a second disc rotatably received within the barrel and pressed against the first disc to selectively form a seal, the second disc having an orifice; and
   a control unit,
   wherein:
      the first disc is coupled to the control unit;
      the second disc is coupled to the rotor to rotate with the rotor; and
      the outlet port is in fluid communication with the stator and sized to deliver sufficient fluid through the stator to spin the rotor, the control unit controlling flow of fluid to the rotor of the motor from a downhole location to provide control over the motor based on downhole sensor data.

15. The bottom hole assembly of claim 14, wherein the inlet port is in fluid communication with a fluid source.

16. The bottom hole assembly of claim 15, wherein the fluid source is an internal cavity of the bottom hole assembly.

17. The bottom hole assembly of claim 16, wherein the by-pass port is in fluid communication with the internal cavity.

18. A method of selectively actuating a motor including a rotor and a stator, the method comprising:
   providing a valve including:
      a barrel having:
         an interior having a circular cross-section;
         an inlet port;
         an outlet port; and
         a by-pass port;
      a first disc rotatably received within the barrel, the first disc having an orifice; and
      a second disc rotatably received within the barrel and pressed against the first disc to selectively form a seal, the second disc having an orifice;
      wherein the second disc is coupled to the rotor and wherein the outlet port is in fluid communication with the motor;
   providing a control unit coupled with the first disc;
   selectively actuating the control unit to rotate the first disc to a desired position to selectively permit fluid flow through the orifices and to the motor; and
   controlling the motor by utilizing the control unit to selectively direct the fluid flow through the valve to the stator when the orifice of the first disc is aligned with the orifice of the second disc, in sufficient quantity to spin the rotor.

* * * * *